United States Patent
Maeda et al.

(10) Patent No.: US 11,242,015 B2
(45) Date of Patent: Feb. 8, 2022

(54) VEHICLE WIRE HARNESS WITH SHEATH COVERING CABLES

(71) Applicant: Hitachi Metals, Ltd., Tokyo (JP)

(72) Inventors: Naoto Maeda, Tokyo (JP); Sachio Suzuki, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 17/009,508

(22) Filed: Sep. 1, 2020

(65) Prior Publication Data

US 2021/0070239 A1 Mar. 11, 2021

(30) Foreign Application Priority Data

Sep. 10, 2019 (JP) .............. JP2019-164537

(51) Int. Cl.
*B60R 16/02* (2006.01)
*H01B 7/00* (2006.01)

(52) U.S. Cl.
CPC ....... *B60R 16/0215* (2013.01); *H01B 7/0045* (2013.01)

(58) Field of Classification Search
CPC .. B60R 16/0215; H01B 7/0045; H01B 7/282; H01B 7/00; H01B 7/187; H02G 15/04; H02G 1/14; H02G 3/00; H02G 3/02; H02G 3/32
USPC ....................................... 174/68.1
See application file for complete search history.

(56) References Cited

U.S. PATENT DOCUMENTS

| | | | | |
|---|---|---|---|---|
| 4,288,107 | A * | 9/1981 | Schwartze | F16L 47/22 285/123.2 |
| 4,298,415 | A * | 11/1981 | Nolt | B29C 61/0641 156/85 |
| 4,311,871 | A * | 1/1982 | Brunner | H02G 15/04 174/74 A |
| 4,723,054 | A * | 2/1988 | Billet | H02G 15/18 174/74 R |
| 5,714,715 | A * | 2/1998 | Sundhararajan | H02G 15/046 174/20 |
| 6,069,319 | A * | 5/2000 | Davis, Jr. | B29C 44/12 174/110 F |
| 10,304,590 | B2 | 5/2019 | Takahashi | |
| 10,399,515 | B2 * | 9/2019 | Shimizu | H01B 7/282 |
| 2018/0218807 | A1 | 8/2018 | Takahashi | |
| 2019/0019602 | A1 * | 1/2019 | Hayakawa | B60T 13/741 |

FOREIGN PATENT DOCUMENTS

JP 2018-125935 A 8/2018

* cited by examiner

*Primary Examiner* — Timothy J Thompson
*Assistant Examiner* — Michael F McAllister
(74) *Attorney, Agent, or Firm* — McGinn I.P. Law Group, PLLC.

(57) ABSTRACT

A vehicle wire harness includes first to third cables to be respectively connected to different connection target objects, a sheath covering all the first to third cables together, and a molded resin member covering a portion of the sheath and a portion of each of the first to third cables. The first to third cables are led out of the molded resin member in different directions from each other.

13 Claims, 5 Drawing Sheets

VEHICLE WIRE HARNESS WITH SHEATH COVERING CABLES

CROSS-REFERENCE TO RELATED APPLICATION

The present application is based on Japanese Patent Application No. 2019-164537 filed on Sep. 10, 2019, the entire contents of which are incorporated herein by reference.

BACKGROUND OF THE INVENTION

1. Field of the Invention

The invention relates to a vehicle wire harness.

2. Description of the Related Art

In case of some of conventional vehicle wire harnesses which are provided with plural cables, each cable is connected to a connection target object arranged on a tire side relative to a suspension arm of a suspension (i.e. arranged under a spring) (see, e.g., JP2018-125935A).

In the wire harness described in JP2018-125935A, a pair of power lines and a pair of signal lines are housed together in a sheath. The pair of power lines are connected to an electric parking brake device and supply an operating current to the electric parking brake device. The pair of signal lines are connected to a wheel speed sensor and transmit a wheel speed detection signal.

The wire harness described in JP2018-125935A is also provided with an adhesive-lined heat shrink tube which covers portions of the pair of power lines and the pair of signal lines led out of the sheath as well as an end portion of the sheath, and a heat shrink fixing tube which covers the outer periphery of the adhesive-lined heat shrink tube as well as a portion of the sheath. The pair of power lines and the pair of signal lines are branched at a portion extending from the adhesive-lined heat shrink tube, and the branching portion is covered with a branching-portion housing.

Patent Document 1: JP2018-125935A

In the meantime, with the sophistication of vehicle electronic controls in recent years, the types and number of electronic devices arranged around tires have been increasing. In case that, e.g., three cables are respectively connected to three different connection targets, at least one cable could be led out in a direction not toward its connection target when branching plural cables only in two directions as in the wire harness described in JP2018-125935A. This may cause the cable length to be increased or the case where, e.g., the drooping cable is likely to come into contact with constituent members of the vehicle such as a suspension or a hub. In addition, when the number of cable clips provided between the sheath and the connection target object is increased to avoid contact of the cable, there is a problem that man-hours to route the cable is increased.

SUMMARY OF THE INVENTION

Therefore, it is an object of the invention to provide a vehicle wire harness which has plural cables to be respectively connected to not less than three connection target objects and can provide improved routing properties of each cable.

For solving the above problem, one embodiment of the invention provides vehicle wire harness, comprising:

first to third cables to be respectively connected to different connection target objects;
a sheath covering all the first to third cables together; and
a molded resin member covering a portion of the sheath and a portion of each of the first to third cables,
wherein the first to third cables are led out of the molded resin member in different directions from each other.

Points of the Invention

According to the present invention, it is possible to provide a vehicle wire harness which has plural cables to be respectively connected to not less than three connection target objects and can provide improved routing properties of each cable.

BRIEF DESCRIPTION OF THE DRAWINGS

Next, the present invention will be explained in more detail in conjunction with appended drawings, wherein.

DETAILED DESCRIPTION OF THE PREFERRED EMBODIMENT

Embodiment

Figure 1:
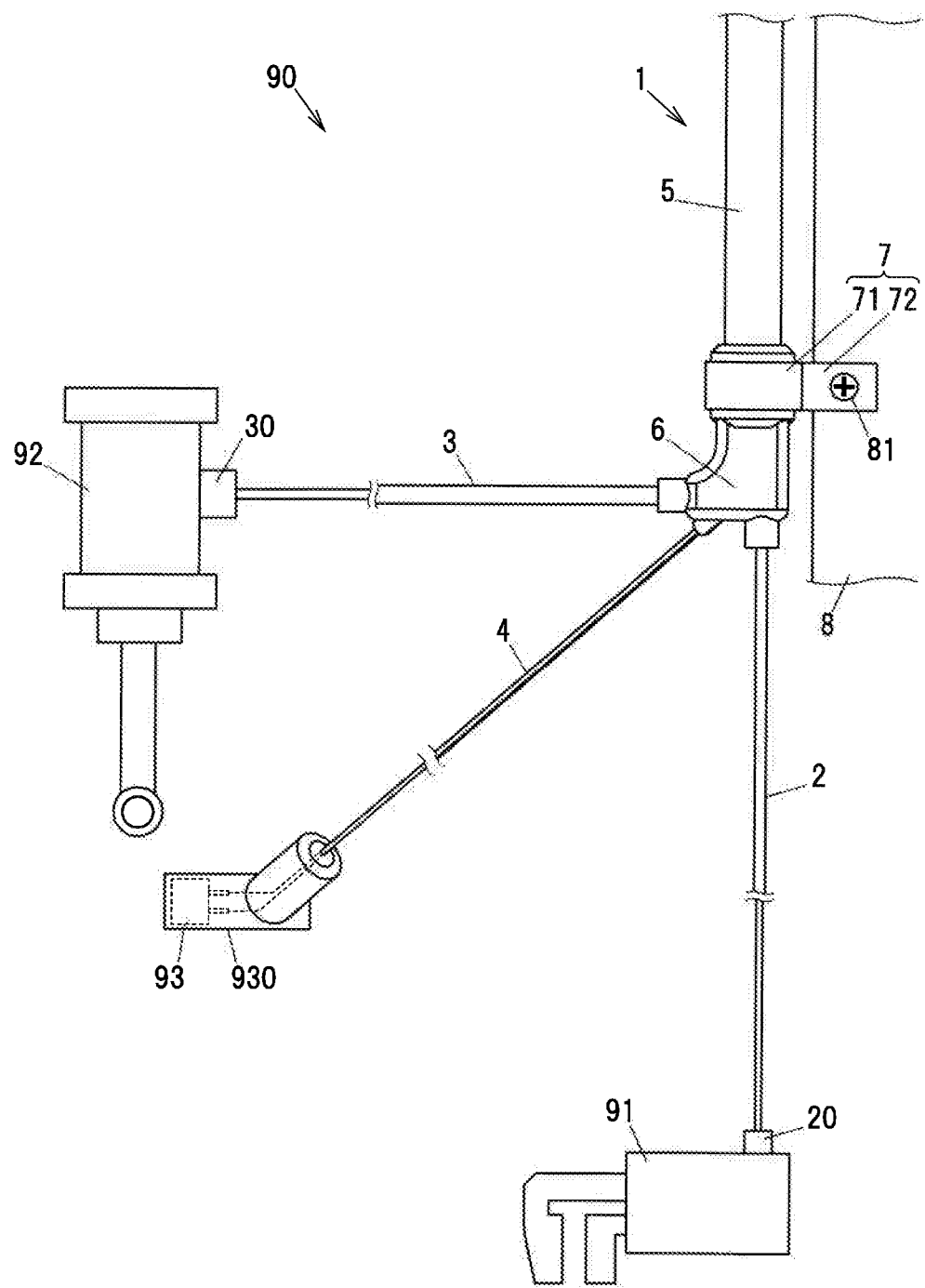
FIG. 1 is a schematic explanatory diagram illustrating a wire harness in an embodiment of the present invention and connection target objects thereof.
Figure 2A:
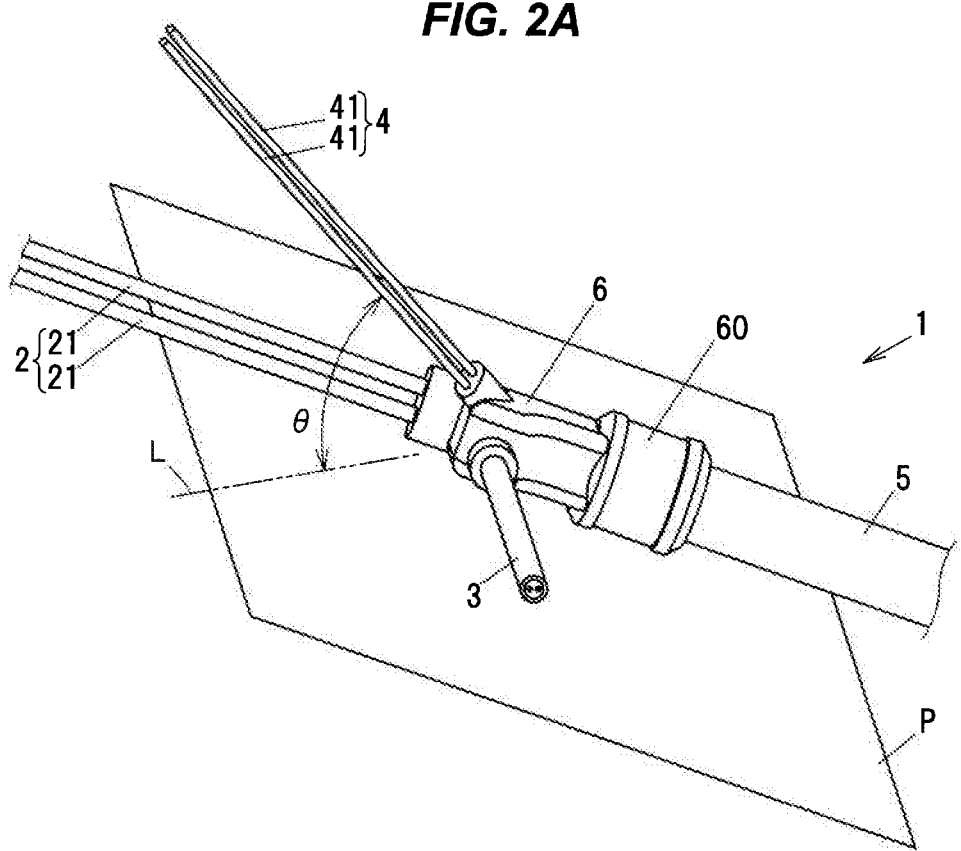
FIGS. 2A and 2B are perspective views showing the wire harness.
Figure 2B:
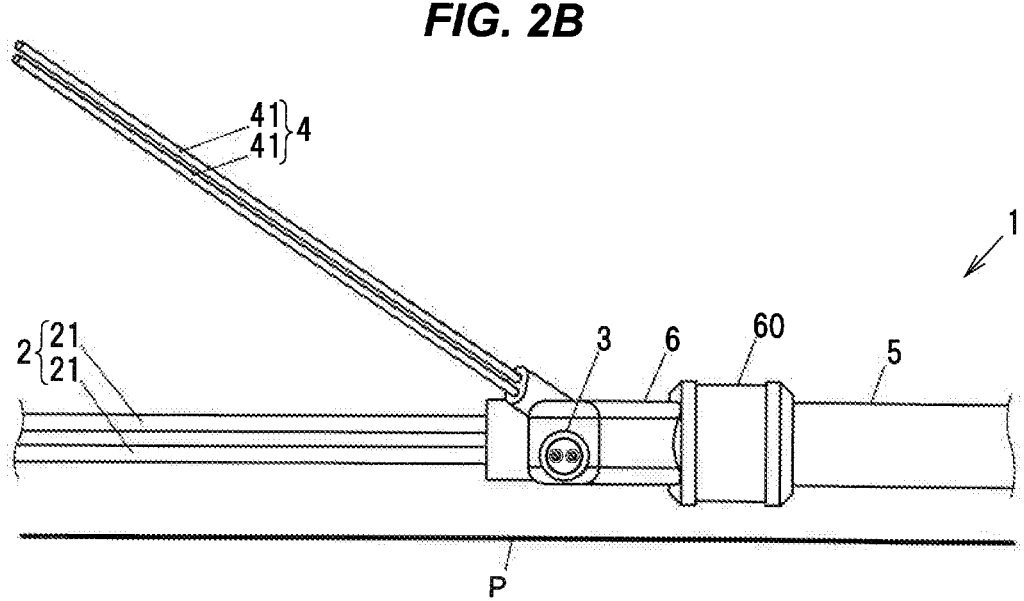

FIG. 1 is a schematic explanatory diagram illustrating a wire harness in an embodiment of the invention and connection target objects thereof. FIGS. 2A and 2B are perspective views showing the wire harness.

A wire harness 1 is a vehicle wire harness installed in a vehicle, and includes first to third cables 2 to 4 to be respectively connected to different connection target objects, a sheath 5 covering all the first to third cables 2 to 4 together, and a molded resin member 6 covering a portion of the sheath 5 and a portion of each of the first to third cables 2 to 4. The molded resin member 6 is formed by injecting molten resin into a mold. In FIG. 1, an electric parking brake device 91, an active damper device 92 and a wheel speed sensor 93 are depicted as examples of the connection target objects to be connected to the first to third cables 2 to 4.

A connector 20 for connection to the electric parking brake device 91 is attached to an end of the first cable 2. A connector 30 for connection to the active damper device 92 is attached to an end of the second cable 3. The wheel speed sensor 93 is covered with a cover member 930 made of a molded resin and is connected to the third cable 4 inside the cover member 930.

After the vehicle is stopped, the electric parking brake device 91 is activated and restricts motion of a wheel. The first cable 2 supplies an operating current to an actuator of the electric parking brake device 91. The active damper device 92, in combination with a coil spring, constitutes a suspension and adjusts vibration damping force under electronic control. The second cable 3 supplies an operating current to an actuator of the active damper device 92. The wheel speed sensor 93 is to detect magnetism of a magnetic body rotating together with the wheel, is attached to a hub supporting the wheel, and outputs a detection signal which is a pulse signal with a period corresponding to the rotational speed of the wheel. The third cable 4 transmits the detection signal of the wheel speed sensor 93 to a control unit of an anti-lock braking system.

Inside a wheel-well 90 of the vehicle, the molded resin member 6 is attached to an attachment portion 8 of a vehicle body by a bracket 7. The bracket 7 includes a holding portion 71 for holding the molded resin member 6, and an attachment portion 72 having a bolt insertion hole through which a bolt 81 for fixing to the attachment portion 8 is inserted. The holding portion 71 is wrapped around so as to be located in an annular groove 60 (see FIGS. 2A and 2B) formed on the molded resin member 6 and holds the molded resin member 6.

The first to third cables 2 to 4 extend out of an end portion 51 of the sheath 5, and the molded resin member 6 covers a portion of each of the first to third cables 2 to 4 extending out of the sheath 5 as well as the end portion 51 of the sheath 5. The first to third cables 2 to 4 are led out of the molded resin member 6 in different directions from each other and are wired inside the wheel-well 90.

In the state where the molded resin member 6 is attached to the attachment portion 8 of the vehicle body by the bracket 7, the lead-out direction of the first cable 2 from the molded resin member 6 is a direction toward the electric parking brake device 91. The lead-out direction of the second cable 3 from the molded resin member 6 is a direction toward the active damper device 92. The lead-out direction of the third cable 4 from the molded resin member 6 is a direction toward the wheel speed sensor 93.

The length of the portions of the first to third cables 2 to 4 led out of the molded resin member 6 is set by taking into account the movable range of the wheel inside the wheel-well 90 in such a manner that the cables do not excessively droop or an excessive tensile force is not generated. The first to third cables 2 to 4 when extending straight along the respective lead-out directions from the molded resin member 6 are shown in FIGS. 1, 2A and 2B.

Figure 3A:
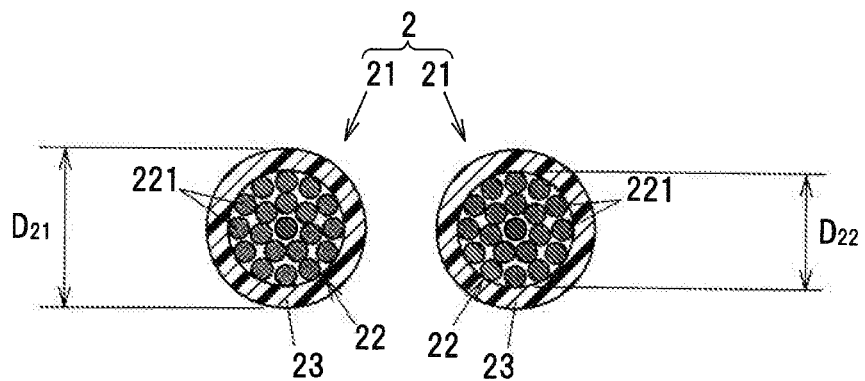
FIG. 3A is a cross sectional view showing a cross section of a first cable.
Figure 3B:
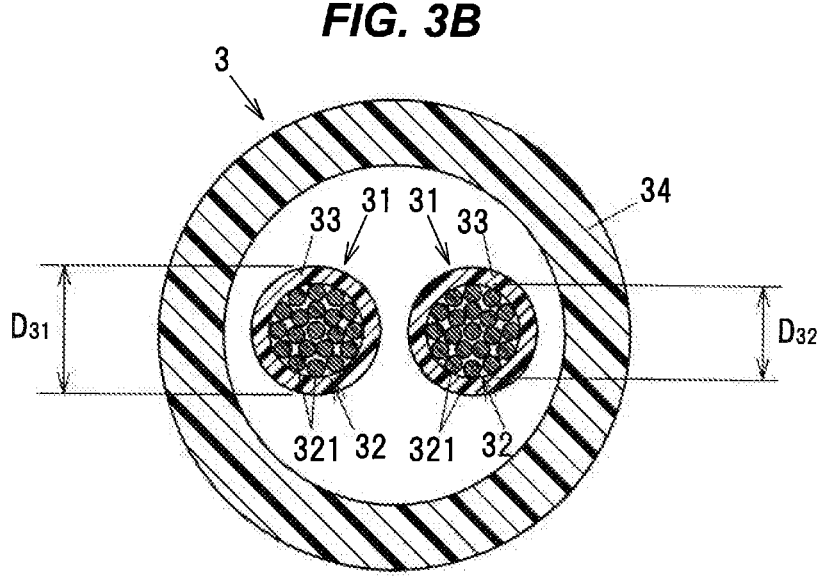
FIG. 3B is a cross sectional view showing a cross section of a second cable.
Figure 3C:
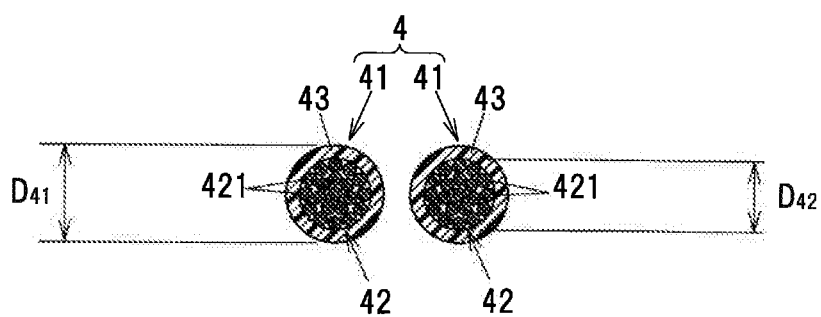
FIG. 3C is a cross sectional view showing a cross section of a third cable.
Figure 4:
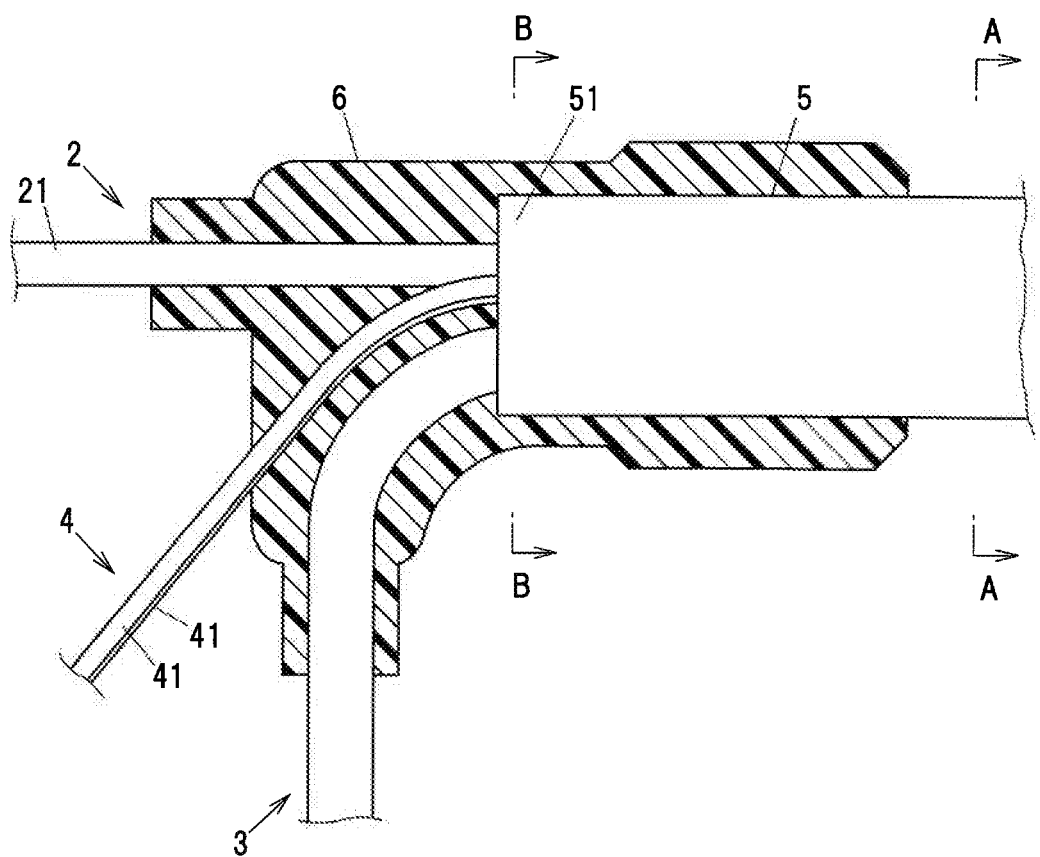
FIG. 4 is a cross sectional view showing a cross section of a molded resin member when taken along a center axis of a sheath.

FIG. 3A is a cross sectional view showing a cross section of the first cable 2. FIG. 3B is a cross sectional view showing a cross section of the second cable 3. FIG. 3C is a cross sectional view showing a cross section of the third cable 4. FIG. 4 is a cross sectional view showing a cross section of the molded resin member 6 when taken along the center axis of the sheath 5.

The first cable 2 includes a pair of insulated wires 21, 21. Each insulated wire 21 is a power line to be connected to the electric parking brake device 91 and includes a center conductor 22 formed by twisting plural strands 221 together that is covered with an insulation 23.

The second cable 3 has a pair of insulated wires 31, 31 which are housed in a tube 34. Each insulated wire 31 is a power line to be connected to the active damper device 92 and includes a center conductor 32 formed by twisting plural strands 321 together that is covered with an insulation 33.

The third cable 4 is constructed from a pair of insulated wires 41, 41. Each insulated wire 41 is a signal line to be connected to the wheel speed sensor 93 and includes a center conductor 42 formed by twisting plural strands 421 together that is covered with an insulation 43.

The strands 221, 321, 421 of the center conductors 22, 32, 42 are made of, e.g., copper, but it is not limited thereto. High-electrical conductivity materials such as silver or aluminum can be appropriately used as the material of the strands 221, 321, 421. The insulations 23, 33, 43 are made of, e.g., an ethylene-based resin which has excellent insulating properties. Specific examples of the ethylene-based resin include high-density polyethylene, linear low-density polyethylene, low-density polyethylene, ethylene-butene-1 copolymer, and ethylene-hexene-1 copolymer, etc.

The tube 34, the sheath 5 and the molded resin member 6 are made of the same type of resin material. Examples of the resin material include urethane and polybutylene terephthalate (PBT), etc. Since the tube 34, the sheath 5 and the molded resin member 6 are made of the same type of resin material, the tube 34, the sheath 5 and the molded resin member 6 are easily fused together by heat during molding of the molded resin member 6 and high water tightness is obtained between these members. On the other hand, the resin material of the molded resin member 6 and the resin material of the insulations 23 and 43 of the first and third cables 2 and 4 are not fused together even by heat of the molded resin member 6 and a small gap may be generated therebetween when, e.g., vibration is applied to the wire harness 1.

As shown in FIGS. 3A to 3C, an outer diameter $D_{31}$ of the insulated wire 31 of the second cable 3 is larger than an outer diameter $D_{41}$ of the insulated wire 41 of the third cable 4, and an outer diameter $D_{21}$ of the insulated wire 21 of the first cable 2 is further larger than the outer diameter $D_{31}$ of the insulated wire 31 of the second cable 3. Then, an outer diameter $D_{32}$ of the center conductor 32 of the insulated wire 31 of the second cable 3 is larger than an outer diameter $D_{42}$ of the center conductor 42 of the insulated wire 41 of the third cable 4, and an outer diameter $D_{22}$ of the center conductor 22 of the insulated wire 21 of the first cable 2 is further larger than the outer diameter $D_{32}$ of the center conductor 32 of the insulated wire 31 of the second cable 3.

The first cable 2 is led out of the molded resin member 6 along a direction parallel to the sheath 5 located inside the molded resin member 6. In other words, the lead-out direction of the first cable 2 from the molded resin member 6 is parallel to the center axis direction of the sheath 5 at a portion held by the molded resin member 6. The second cable 3 is bent inside the molded resin member 6 and is led out of the molded resin member 6 along a direction perpendicular to the lead-out direction of the first cable 2.

The third cable 4 is led out of the molded resin member 6 along a direction inclined with respect to an imaginary plane P (see FIGS. 2A and 2B) which is parallel to the lead-out direction of the first cable 2 and the lead-out direction of the second cable 3 from the molded resin member 6. The third cable 4 is projected on the imaginary plane P and is indicated by a projection line L (a phantom line) in FIG. 2A, and an angle of inclination of the third cable 4 with respect to the imaginary plane P, i.e., an angle θ formed by the projection line L and the lead-out direction of the third cable 4 is an acute angle. In addition, when viewed in a direction perpendicular to the imaginary plane P, the third cable 4 extends in a direction inclined with respect to the first cable 2 and the second cable 3 so as not to overlap the first cable 2 and the second cable 3.

Figure 5A:
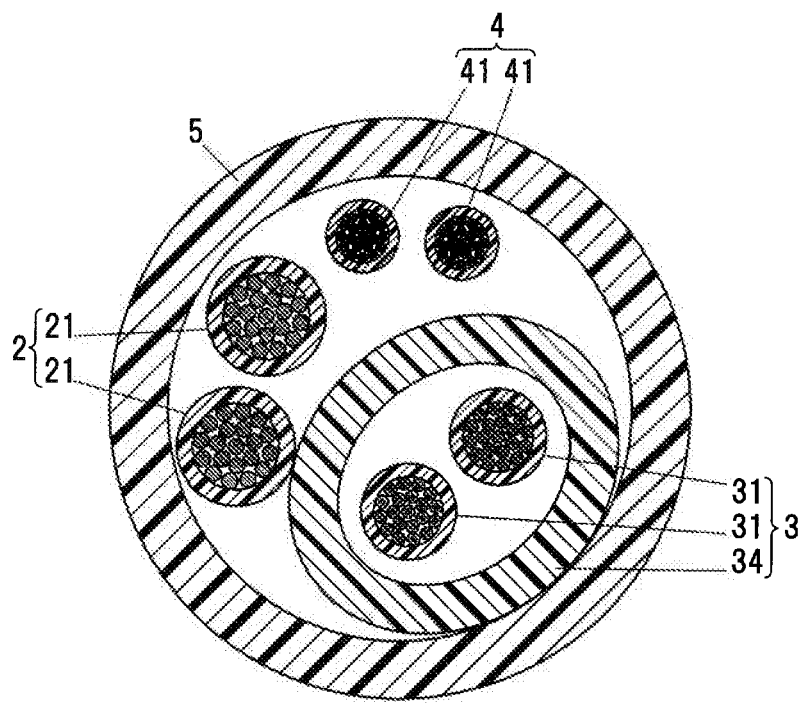
FIG. 5A is a cross sectional view showing the first to third cables and the sheath when taken along line A-A of FIG. 4.
Figure 5B:
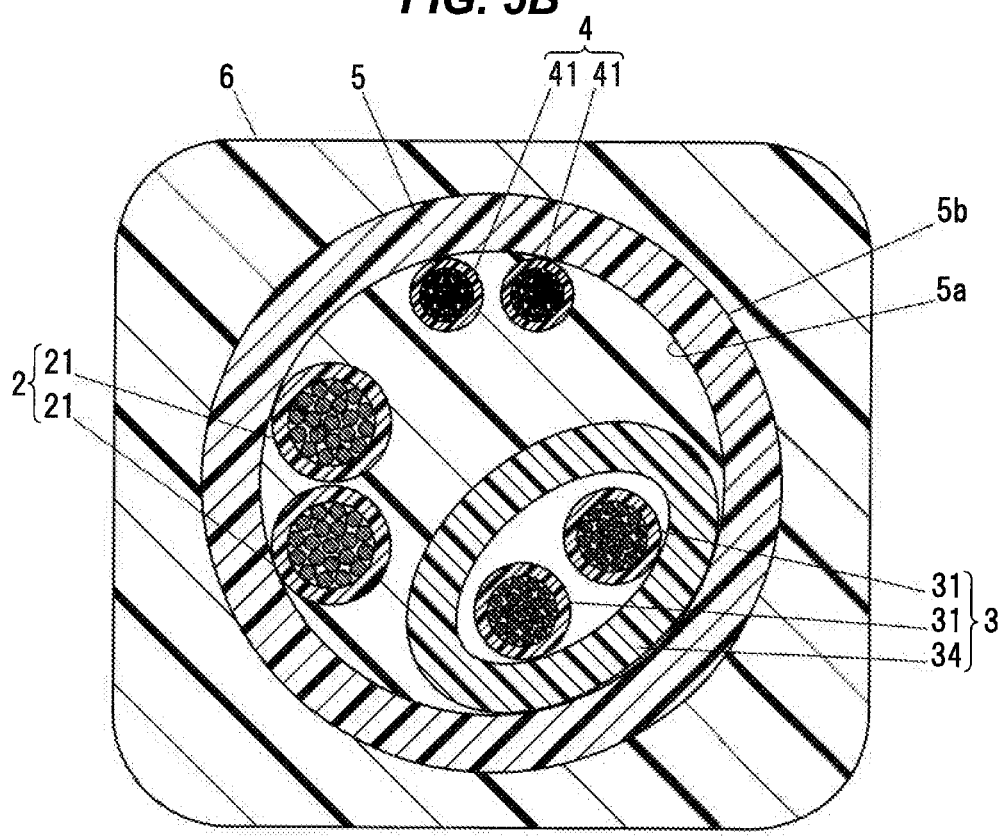
FIG. 5B is a cross sectional view showing the first to third cables and the sheath when taken along line B-B of FIG. 4.

FIG. 5A is a cross sectional view showing the first to third cables 2 to 4 and the sheath 5 when taken along line A-A of FIG. 4, and FIG. 5B is a cross sectional view showing the first to third cables 2 to 4 and the sheath 5 when taken along line B-B of FIG. 4. The cross section shown in FIG. 5A is a cross section outside the molded resin member 6.

When molding the molded resin member 6, since the second and third cables 3 and 4 placed in a mold are bent in the respective lead-out directions, a space is formed at the center of the end portion 51 of the sheath 5 and this space is larger than that in the cross section shown in FIG. 5A. A resin melted at the time of molding of the molded resin member 6 enters this space, and the first to third cables 2 to 4 come further closer to an inner circumferential surface 5a of the sheath 5 due to pressure of the molten resin entering the end portion 51 of the sheath 5. Thus, at the end portion 51 of the sheath 5, the first to third cables 2 to 4 are offset in the respective lead-out directions and arranged close to the inner circumferential surface 5a of the sheath 5, as shown in FIG. 5B.

In addition, since the pressure of the molten resin also acts on an outer circumferential surface 5b of the sheath 5 in a manner of causing shrinkage of the sheath 5, pressure of the molten resin entering the end portion 51 of the sheath 5 is increased and the resin material of the molded resin member 6 tightly adheres to outer circumferential surfaces of the insulations 23 and 43 of the insulated wires 21 and 41 of the first and third cables 2 and 4. This suppresses ingress of water into the sheath 5.

Functions and Effects of the Embodiment

In the embodiment described above, since the first to third cables 2 to 4 are led out of the molded resin member 6 in different directions from each other toward the electric parking brake device 91, the active damper device 92 and the wheel speed sensor 93 which are the respective connection target objects, it is possible to improve routing properties of the first to third cables 2 to 4 as compared to, e.g., when each cable is led out in the same direction.

In addition, the first cable 2 of which center conductors 22 have the largest outer diameter among the center conductors of the first to third cables 2 to 4 is led out of the molded resin member 6 along the direction parallel to the sheath 5 inside the molded resin member 6 and does not need to be bent in the molded resin member 6. That is, since the second and third cables 3 and 4 which are relatively easy to bend are bent in the molded resin member 6, it is possible to bend with a smaller curvature radius and thus possible to reduce the size of the molded resin member 6.

Furthermore, since the first to third cables 2 to 4 are three-dimensionally led out in the different directions, the molten resin can easily enter the end portion 51 of the sheath 5, suppressing ingress of water into the sheath 5.

SUMMARY OF THE EMBODIMENT

Technical ideas understood from the embodiment will be described below citing the reference numerals, etc., used for the embodiment. However, each reference numeral described below is not intended to limit the constituent elements in the claims to the members, etc., specifically described in the embodiment.

[1] A vehicle wire harness (1), comprising: first to third cables (2 to 4) to be respectively connected to different connection target objects (91 to 93); a sheath (5) covering all the first to third cables (2 to 4) together; and a molded resin member (6) covering a portion of the sheath (5) and a portion of each of the first to third cables (2 to 4), wherein the first to third cables (2 to 4) are led out of the molded resin member (6) in different directions from each other.

[2] The vehicle wire harness (1) described in al, wherein the third cable (4) is led out of the molded resin member (6) along a direction inclined with respect to an imaginary plane (P) that is parallel to a lead-out direction of the first cable (2) and a lead-out direction of the second cable (3) from the molded resin member (6).

[3] The vehicle wire harness (1) described in [1] or [2], wherein each of the first to third cables (2 to 4) comprises a plurality of insulated wires (21, 31, 41) each formed by covering a center conductor (22, 32, 42) with an insulation (23, 33, 43), the center conductor (22) of the insulated wire (21) of the first cable (2) has a larger outer diameter than the center conductors (32, 42) of the insulated wires (31, 41) of the second and third cables, and the first cable (2) is led out of the molded resin member (6) in a direction parallel to the sheath (5) located inside the molded resin member (6).

[4] The vehicle wire harness (1) described in any of [1] to [3], wherein the first cable (2) comprises a plurality of power lines (21) to be connected to an electric parking brake device (91).

[5] The vehicle wire harness (1) described in any of [1] to [4], wherein the third cable (4) comprises a plurality of signal lines (41) to be connected to a wheel speed sensor (93).

Although the embodiment of the invention has been described, the invention according to claims is not to be limited to the embodiment described above. Further, please note that all combinations of the features described in the embodiment are not necessary to solve the problem of the invention.

In addition, the invention can be appropriately modified and implemented without departing from the gist thereof. For example, although the electric parking brake device 91, the active damper device 92 and the wheel speed sensor 93 have been described as the connection target objects to be connected to the first to third cables 2 to 4 in the embodiment, the connection target objects may be other devices, etc. In addition, the number of cables provided in the wire harness is not limited to three and may be four or more.

What is claimed is:

1. A vehicle wire harness, comprising:
   first to third cables to be respectively connected to different connection target objects;
   a sheath covering all the first to third cables together; and
   a molded resin member covering a portion of the sheath and a portion of each of the first to third cables,
   wherein the first to third cables are led out of the molded resin member in different directions from each other,
   wherein the third cable is led out of the molded resin member along a direction inclined with respect to an imaginary plane that is parallel to a lead-out direction of the first cable and a lead-out direction of the second cable from the molded resin member, and
   wherein an imaginary extended line of the third cable led out of the molded resin member penetrates through the imaginary plane.

2. The vehicle wire harness according to claim 1, wherein each of the first to third cables comprises a plurality of insulated wires each formed by covering a center conductor with an insulation, the center conductor of the insulated wire of the first cable has a larger outer diameter than the center conductors of the insulated wires of the second and third cables, and the first cable is led out of the molded resin member in a direction parallel to the sheath located inside the molded resin member.

3. The vehicle wire harness according to claim 1, wherein the first cable comprises a plurality of power lines to be connected to an electric parking brake device.

4. The vehicle wire harness according to claim 1, wherein the third cable comprises a plurality of signal lines to be connected to a wheel speed sensor.

5. The vehicle wire harness according to claim 1, wherein when viewed in a direction perpendicular to the imaginary plane, the third cable is located between the first cable and the second cable.

6. The vehicle wire harness according to claim 1, wherein an angle formed by the imaginary plane and the third cable comprises an acute angle.

7. The vehicle wire harness according to claim 1, wherein an angle formed by the imaginary plane and a lead-out direction of the third cable led out of the molded resin member comprises an acute angle.

8. The vehicle wire harness according to claim 1, wherein an angle formed by the imaginary extended line of the third cable and a lead-out direction of the third cable comprises an acute angle.

9. The vehicle wire harness according to claim 1, wherein when viewed in a direction perpendicular to the imaginary plane, the third cable extends in a direction inclined with respect to the first cable and the second cable so as to be separate from the first cable and the second cable.

10. The vehicle wire harness according to claim 1, wherein when viewed in a direction perpendicular to the imaginary plane, the first cable, second cable, and third cable are all separate from one another.

11. The vehicle wire harness according to claim 1, wherein when viewed in a direction parallel to the imaginary plane, the third cable extends in a direction inclined with respect to the first cable and the second cable so as to be separate from the first cable and the second cable.

12. The vehicle wire harness according to claim 1, wherein an angle of inclination of the third cable with respect to the imaginary plane is an acute angle.

13. The vehicle wire harness according to claim 1, wherein, when viewed in a direction perpendicular to the imaginary plane, the third cable extends in the direction inclined with respect to the first cable and the second cable, so as not to overlap the first cable and the second cable.

* * * * *